Figure 1:
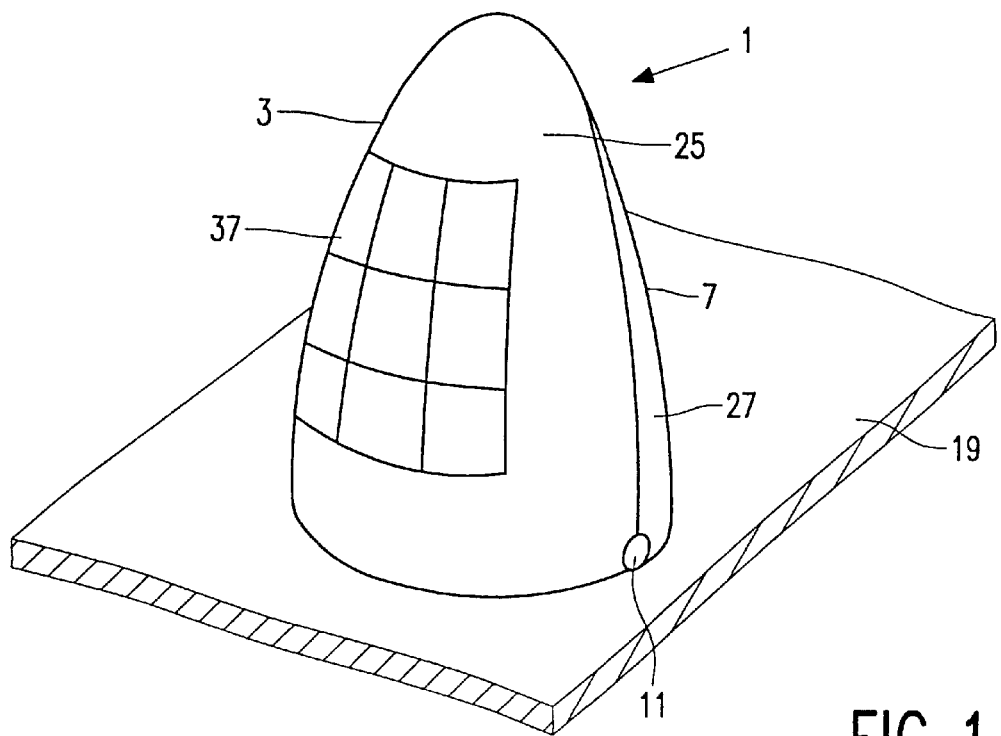

United States Patent
Van Lerberghe

[19]

[11] Patent Number: 6,006,103
[45] Date of Patent: Dec. 21, 1999

[54] FOLDABLE CORDLESS TELEPHONE FUNCTIONING IN AN UPRIGHT POSITION WHEN FOLDED

[75] Inventor: Steven J.W. Van Lerberghe, Eindhoven, Netherlands

[73] Assignee: U.S. Philips Corporation, New York, N.Y.

[21] Appl. No.: 08/990,928

[22] Filed: Dec. 15, 1997

[30] Foreign Application Priority Data

Dec. 17, 1996 [EP] European Pat. Off. .............. 96402769

[51] Int. Cl.[6] .................................................. H04M 11/00
[52] U.S. Cl. ............................ 455/550; 455/90; 455/575
[58] Field of Search ..................................... 455/569, 573, 455/95, 555, 575, 550, 90; 379/428, 433, 434, 435, 436

[56] References Cited

U.S. PATENT DOCUMENTS

| | | | |
|---|---|---|---|
| 3,551,607 | 12/1970 | Tommasi et al. ....................... | 179/103 |
| 4,897,873 | 1/1990 | Beutler et al. ........................... | 379/433 |
| 5,138,651 | 8/1992 | Sudo ....................................... | 455/569 |
| 5,148,471 | 9/1992 | Metroka et al. .......................... | 379/58 |
| 5,276,916 | 1/1994 | Pawlish et al. ............................ | 455/89 |
| 5,526,405 | 6/1996 | Toda ......................................... | 455/569 |
| 5,572,575 | 11/1996 | Yamamoto et al. ..................... | 455/569 |
| 5,579,388 | 11/1996 | Endroes et al. .......................... | 379/433 |
| 5,692,046 | 11/1997 | Jambhekar ............................... | 379/433 |

FOREIGN PATENT DOCUMENTS

| | | | |
|---|---|---|---|
| 0601876A1 | 6/1994 | European Pat. Off. .......... | G01L 3/00 |
| 19521135 | of 0000 | Germany .......................... | H04B 1/38 |
| 19521135C | 11/1996 | Germany . | |
| 591171A | 4/1993 | Japan .............................. | H04M 1/02 |
| 5336023A | 12/1993 | Japan .............................. | H04B 7/26 |

*Primary Examiner*—Edward F. Urban
*Assistant Examiner*—Thuan T. Nguyen

[57] ABSTRACT

A cordless telephone is provided with a first part having a loudspeaker, a second part having a microphone, and furthermore with a hinge by means of which the second part is pivotable relative to the first part between a folded state, in which the second part lies over the first part, and an open state, in which the second part lies at least substantially in the extended direction of the first part. The first and second parts are provided with support portions adjacent the hinge by which the telephone in its folded state is supported in a vertical position on an at least substantially flat base surface in a stable manner.

8 Claims, 5 Drawing Sheets

FOLDABLE CORDLESS TELEPHONE FUNCTIONING IN AN UPRIGHT POSITION WHEN FOLDED

The invention relates to a cordless telephone provided with a first part comprising a loudspeaker, a second part comprising a microphone, and a hinge by means of which the second part is pivotable relative to the first part between a folded state with the second part lying over the first part and an open state with the second part lying at least substantially in the extended direction of the first part. Such a cordless telephone may be a portable telephone which can communicate wirelessly with a base station coupled to the public telephone network or a portable telephone suitable for use in a cellular telephone network, or any other suitable portable telephone.

Such a cordless telephone is known from U.S. Pat. No. 4,897,873. The second part of this known cordless telephone covers the various operational keys of the telephone set in the folded state. As a result, the telephone has a more or less closed shape with the second part in the folded shape, which brings with it the advantages that the dimensions of the telephone are reduced to a minimum and that the operational keys cannot be inadvertently pressed, for example when the telephone is carried in the pocket of a garment or in a briefcase. A disadvantage of the known telephone is that, with the lid folded in, the telephone can only be placed on a base surface, such as a table or desk top, in the horizontal lying state on its upper or lower surface. As a result, the telephone occupies comparatively much space on the surface, it can easily get lost under documents, files, and the like owing to its flat shape, and it always faces the base surface with a comparatively large surface area, while it is not certain beforehand which this will be, the front or the rear of the telephone. It is accordingly difficult to make provisions in said surfaces for certain telephone functions which must also be available in the folded state.

The invention has for its object to provide a cordless telephone of the kind mentioned in the opening paragraph with which these disadvantages of the known cordless telephones are eliminated.

According to the invention, the cordless telephone is for this purpose characterized in that the first and the second part are provided with support portions adjacent the hinge which in the folded state form a stable support for the vertical placement of the folded telephone on an at least substantially flat supporting surface. The invention ensures by means of a suitable shaping of the first and second parts adjacent the hinge that the telephone can be placed vertically on a supporting surface with the second part folded in. As a result, it occupies little space on a table or desk top, win not easily become covered by documents, files, etc. owing to its vertical shape, while in addition the telephone in the folded state is always in a defined position.

An embodiment of the telephone according to the invention is characterized in that outward facing boundary surfaces of the first and the second part present adjacent the hinge are situated at least substantially in a common support surface in the folded state, and in that said support portions form part of said boundary surfaces. No special components are necessary for placing the folded telephone vertically in this embodiment. The telephone rests simply on support portions present as part of said support surface.

A preferred embodiment is characterized in that the second part in the folded state covers the first part at least substantially, and in that the outward facing surfaces of the folded parts merging into the boundary surfaces are situated substantially in a common uninterrupted three-dimensional plane with a fluent curvature. This embodiment utilizes the principles of the invention in an inventive manner in order to obtain a cordless telephone which in the folded state can have an aesthetically attractive appearance. Said three-dimensional plane with fluent curvature may be shaped, for example, substantially as a rounded cone or approximately half an ellipsoid.

The fact that the telephone in the folded state always occupies a defined position, i.e. with its support surface resting on the base surface, renders it possible to use a further interesting embodiment of the invention which is characterized in that switching means are present in said support surface for switching a function of the telephone, which switching means are operated when the folded telephone is placed on or lifted from a flat surface. The switching means may serve, for example, for switching the telephone function on and off.

The presence of the switching means also renders it advantageous to provide a further embodiment of the invention with the further characteristic that the telephone is provided with a hands-free function, and that said switching means serve for switching the hands-free function on and off. The cordless telephone is thus provided with an automatically operating hands-free function for, for example, answering incoming calls, a function which had hitherto been available only in the conventional telephones with cord connection.

A next embodiment utilizes the offered possibilities to an even greater extent and is characterized in that the telephone is provided with a voice operation function and is provided with a speech recognition program for recognizing spoken commands. This embodiment of the telephone may be used in the folded state, for example, for making or answering a telephone call under the control of speech commands.

An embodiment of the invention which is of importance in view of the above novel functions of the folded telephone is characterized in that the loudspeaker remains acoustically uncovered in the folded state, and in that the second part is provided with an acoustical passage in the outer surface to a microphone present in the second part. This embodiment could in addition be characterized in that a single microphone is present which is acoustically accessible through said acoustical passage to the outer surface of the second part of the telephone and through another acoustical passage to the opposite side. This latter embodiment has the advantage that only a single microphone need be used, which is acoustically accessible both when the second part is open and when the second part is folded in.

Since the telephone according to the invention in the folded state always rests with a comparatively small surface area on a base surface, a further embodiment of the invention may advantageously be used which is characterized in that solar power cells are present on the three-dimensional curved outer surface for charging a battery in the telephone. This embodiment utilizes the comparatively large available outer surface of the telephone in the folded state to advantage, in particular the fact that this surface area is always completely available.

Figure 2:
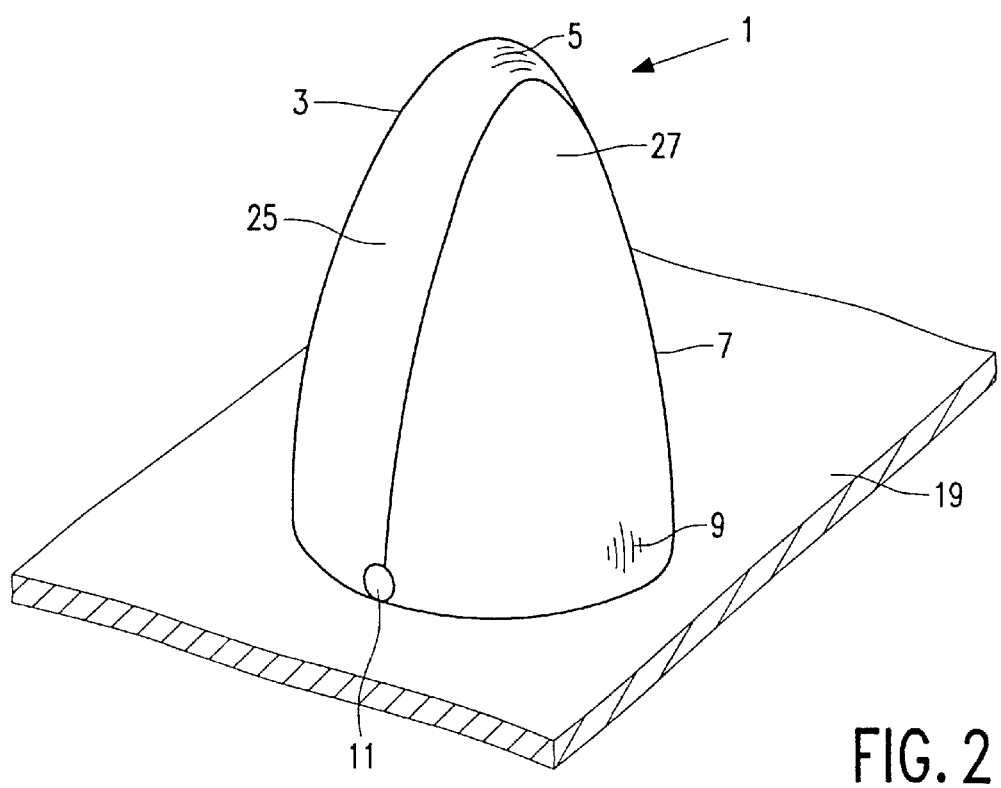
Figure 3:
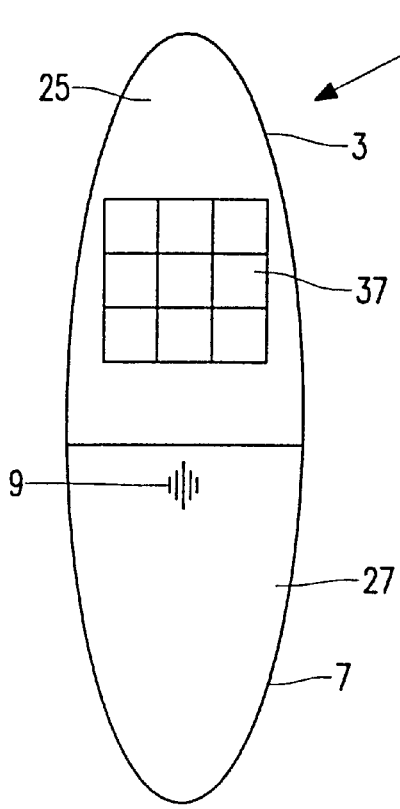
Figure 4:
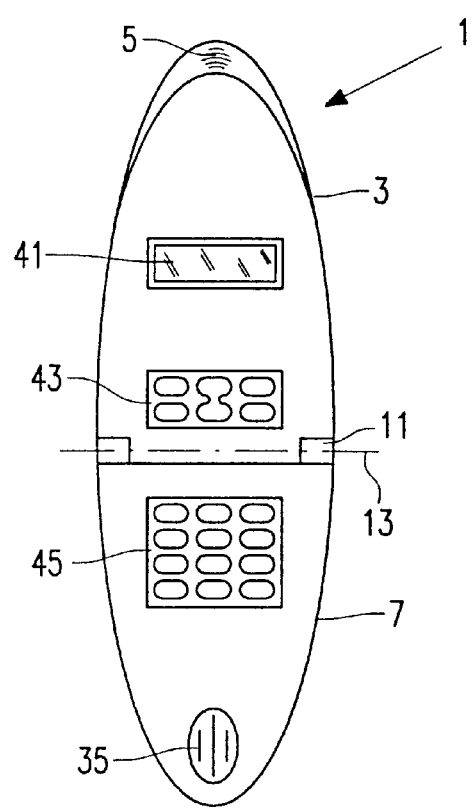
Figure 5:
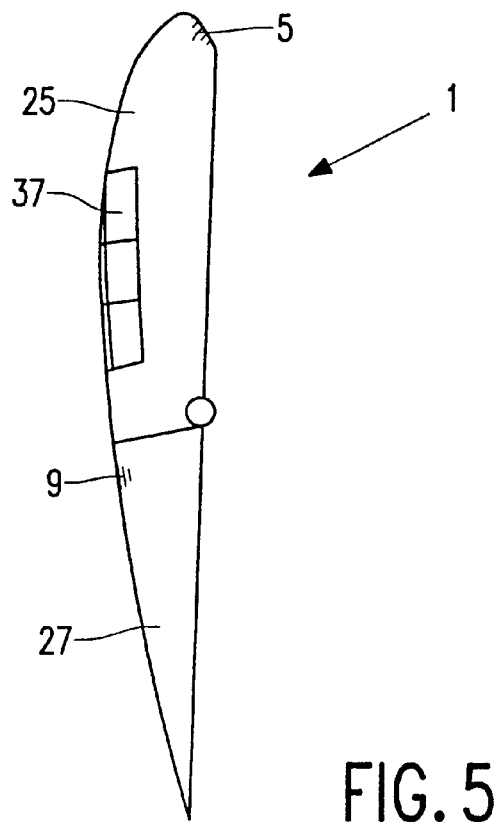
Figure 6:
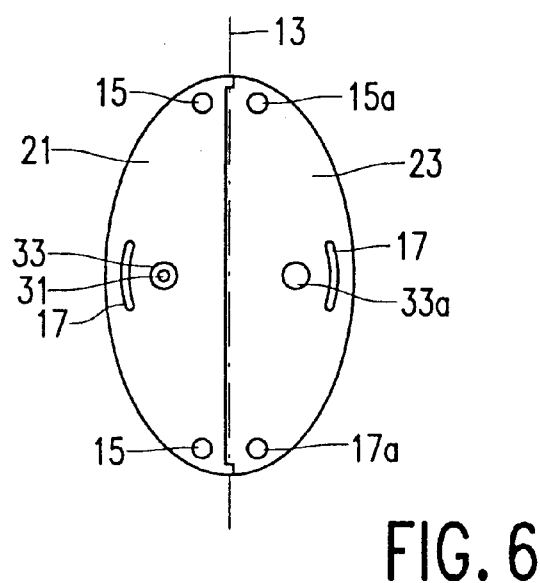
Figure 7:
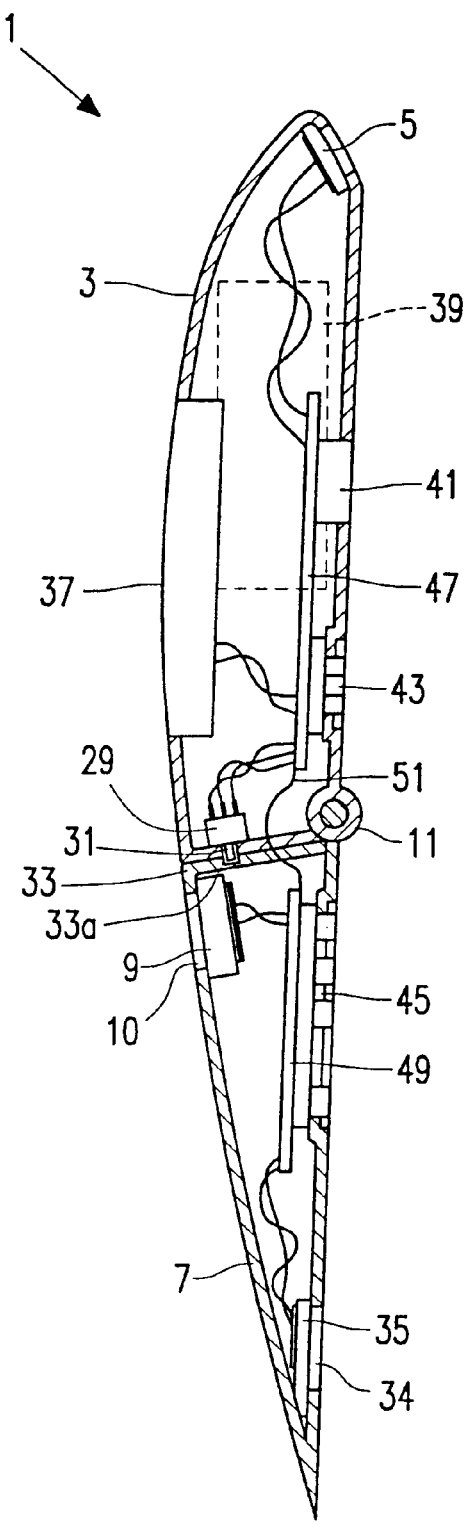
Figure 8:
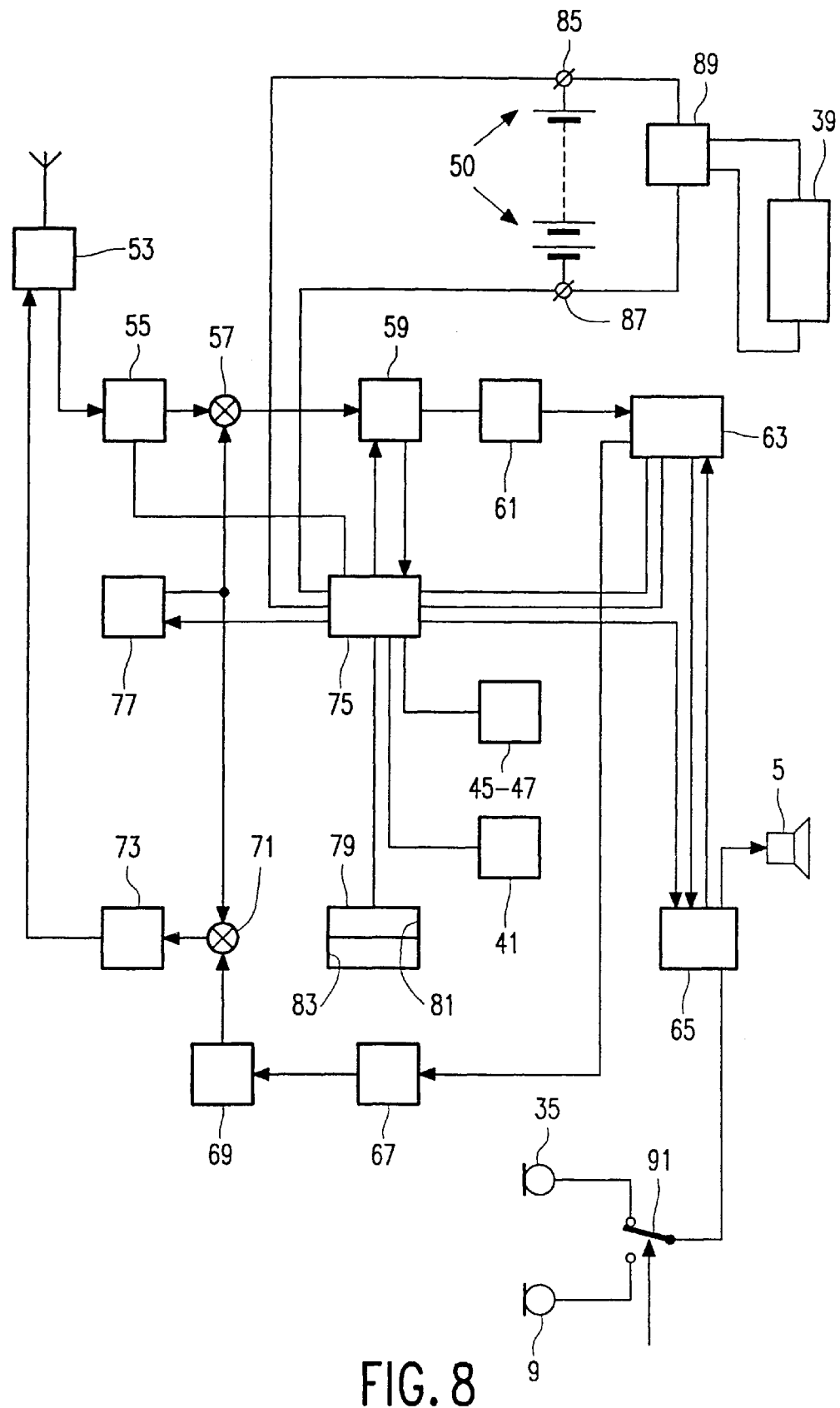

The invention will now be explained in more detail with reference to the drawing which relates to an embodiment of the invention and in which:

FIG. 1 is a perspective view of mainly the first part of the cordless telephone according to the invention in the folded state, FIG. 2 is a similar perspective view, now mainly of the second part of the telephone, FIG. 3 is an elevation of the rear of the cordless telephone according to the invention, with the second part completely folded out, FIG. 4 is an elevation similar to FIG. 3, but this type showing the front of the telephone, FIG. 5 is a side elevation of the telephone in the state as depicted in FIGS. 3 and 4, FIG. 6 is a bottom view of the telephone in the folded state, FIG. 7 is a lateral cross-section of the telephone in the state of FIG. 5, and FIG. 8 is a block diagram of an electrical circuit of an embodiment of the cordless telephone according to the invention.

Corresponding components have been given the same reference numerals in the various Figures.

FIGS. 1 and 2 show the cordless telephone 1 according to the invention in the folded, vertical standing position. The telephone is provided with a first part 3 with a loudspeaker 5 and with a second part 7 with an external microphone 9. A hinge 11 is present between the two parts, so that the second part 7 can be pivoted relative to the first part 3 between a folded state with the second part 7 lying over the first part 3, see FIGS. 1 and 2, and an open state with the second part 7 at least substantially in the extended direction of the first part 3, see FIGS. 3, 5 and 7. The hinge may be of any conventional kind, for example of the kind as known from cited U.S. Pat. No. 4,897,873, which is deemed to be incorporated in the present application by reference. The details of the hinge construction will accordingly not be discussed in any detail. It suffices here to note that the hinge construction can be such that the movement of the second part from the folded state into the open state may operate a switch which cooperates with the hinge, and that the hinge construction may be provided with resilient retention means which keep the second part in the folded state, and possibly also in the open state, with some resilience. The forces occurring in this mechanism may be such that it is possible, during lifting of the telephone according to the invention, for the second part to be automatically folded out about the pivot axis 13 into the open state by means of a suitable movement.

According to the invention, the first and the second part 3, 7 have respective support portions 15, 17 adjacent the hinge 11, which portions in the folded state form a stable support for placing the folded telephone vertically on an at least substantially flat surface such as, for example, a desk top 19, see FIGS. 1 and 2.

The support portions 15 and 17 in the embodiment drawn, see FIG. 6, comprise three small studs which belong to boundary surfaces 21 and 23 of the first part 3 and the second part 7, respectively, of the telephone which are present adjacent the hinge 11, which face towards the outside in the folded state, and which lie at least substantially in a common flat support plane in the folded state. The flat boundary surfaces 21 and 23 are provided with recesses 15a and 17a which accommodate the respective studs 15 and 17 when the second part 7 is in the open state.

As is apparent especially from FIG. 2, the second part 7 covers the first part 3 substantially entirely in the folded state. The downward facing boundary surfaces 21, 23, see FIGS. 1 and 2, merging into outward facing surfaces 25 and 27 of the folded parts 3 and 7 are situated on a common uninterrupted three-dimensional plane with a fluent curvature. This outer surface in the embodiment drawn is approximately semi-ovular, but with an oval cross-section and somewhat sloping relative to the perpendicular to the bottom surface 19. As a result, the folded telephone has an aesthetically attractive appearance. The Figures, however, merely show a possible embodiment; the appearance may be differently designed in dependence on design requirements.

Switching means, inter alia in the form of a mechanically operated switch 29, are present in or adjacent the support surface at the lower side of the folded telephone formed by the two boundary surfaces 21, 23. This switch is provided with a pushbutton 31 which projects to the exterior through an opening 33 in the bottom surface 21 of the first part 3 of the telephone. A cavity 33a is present in the bottom surface 23 of the second part of the telephone so as to accommodate the pushbutton 31 in the non-depressed state when the second part 7 is folded out, i.e. open. The switch serves for switching a telephone function. When the telephone is put down in the folded state, the pushbutton 31 is depressed to the inside owing to its contact with the base surface 19, so that the switch is operated and a function of the telephone is energized. When the telephone is lifted, the pushbutton is pressed out again by a spring present in the switch, so that the switch returns into the position in which it was before putting down. A telephone function can be automatically switched on or off with this switch, for example, the telephone function may be automatically switched on when the telephone is lifted and switched off again when the telephone is put down. Another possibility is to provide the telephone with a hands-free function, in which case the switch 29 may be used for switching the hands-free function on and off. It is obviously possible to operate several functions by means of the switch. An interesting option is to provide the telephone with a voice operating function, for which purpose it should be provided with a speech recognition program for recognizing spoken commands. This will be discussed in more detail further below with reference to the block diagram of FIG. 8.

As is apparent from FIGS. 2, 4, 5 and 6, the loudspeaker 5 of the telephone remains acoustically accessible in the folded state, see in particular FIG. 2. The loudspeaker is accordingly acoustically accessible from the outside also in the folded state. An acoustical passage to the microphone 9 via the openings 10 is also present in the second part 27 of the outer surface of the telephone. In the embodiment drawn, two separate microphones are present in the second part 7 of the telephone, i.e. the microphone 9 mentioned above, which is acoustically accessible from the outside through openings 10 in the folded state, and a microphone 35 which is present adjacent the lower side of the telephone, see FIGS. 4 and 7, when the second part is folded open. This microphone serves for normal use of the telephone and is acoustically accessible through openings 34.

An alternative possible embodiment of the invention is not shown, where only a single microphone is used inside the second part 7 of the telephone instead of two microphones 9 and 35, which single microphone is then acoustically accessible both in the folded and in the open state through corresponding acoustical passages. Although this embodiment is not shown in the drawing, such an arrangement of the microphone, possibly an adapted microphone utilizing different acoustical channels, is deemed to be readily realizable to those skilled in the art on the basis of their normal skills and the contents of the present application.

FIG. 1 and FIG. 3 diagrammatically indicate the presence of a number of solar power cells 37 on the first part 25 of the outer shell surface of the telephone for charging a battery 39 which is present in the telephone and which is indicated diagrammatically only in FIG. 7.

In the open state, see FIGS. 4 and 7, the loudspeaker 5 and the microphone 35 are so positioned that they are available for the normal telephone function. An LCD screen 41, a field 43 with function selection keys, and a field 45 with mainly numerical keys are present in a usual arrangement at the front of the folded-out telephone. These components of the telephone are not described in any detail because they are usual in portable telephones. Both the LCD display 41 and the fields of keys 43 and 45 are recessed, which is visible especially in FIG. 7, so that the two parts 3 and 7 of the telephone lie flat against one another in the folded state. Usual electronic circuits, for example arranged on two printed circuit boards 47 and 49, are present inside the telephone. These circuits are in connection with one another via one or several conductors 51 and are connected to other telephone components such as the LCD display, the solar power cells 37, the microphones 9 and 35, and the loudspeaker 5 via other, further conductors which are indicated in the drawing but not provided with reference numerals.

FIG. 8 is a block diagram of the portable telephone 1 according to the invention. The telephone 1 comprises a receiver path and a transmitter path which are coupled to an antenna switch 53. The receiver path comprises a cascade circuit of a tunable HF filter 55, a mixing stage 57, a switchable intermediate frequency filter 59, a demodulator 61, a TDMA ("Time Division Multiple Access") control device 63, a speech coding and decoding device CODEC 65, and the loudspeaker 5. The transmitter path comprises a cascade circuit of the microphone 35, the CODEC 65, the TDMA control device 63, a modulator 67, a bias oscillator 69, a mixing stage 71, and a power amplifier 73. A microprocessor 75 is further provided, designed for controlling the telephone functions. Usual functions such as the control of a controllable frequency generating device 77 which is also present for tuning to a certain channel, control of the TDMA control device 63, scanning of the keyboard 45-47, and control of the LCD display 41 are not described in detail any further because such functions are known per se in the technical field. The telephone further comprises a memory device 79 coupled to the microprocessor 75 and comprising a non-volatile memory portion 81 and a volatile memory portion 83. The non-volatile memory portion 81 comprises a function control program for controlling functions of the telephone, among which the usual telephone functions. Supply contacts 85 and 87 are also shown, to which the battery 39, which can be detached from the device, can be connected. The battery serves to supply the telephone. The supply of the microprocessor 75 only is indicated for the sake of simplicity. The solar panel 37 can charge the battery 39 via a battery charging device 89 connected thereto. The two microphones 9 and 35 present can be coupled alternately to the CODEC 65 via a selection switch 91 in dependence on the position of the first and second parts 3 and 7 of the telephone 1. The microphone 35 is active when the parts 3 and 7 are positioned relative to one another in the usual telephone state, and the microphone 9 is active when the parts are mutually positioned in the folded state, in which the telephone can be placed on a flat surface in a stable manner according to the invention. In this latter state, the telephone may be used for a so-called hands-free function, and a speech recognition program present in the memory portion 81 is active then for recognizing control commands spoken through the microphone 9 independently of the speaker. After a connection has been achieved, the microphone 9 then serves to take in a speech signal. The speech recognition program recognizes at least the following spoken commands: "Select" for initiating a selection command, "Zero", "One", "Two", "Three", "Four", "Five", "Six", "Seven", "Eight", and "Nine" for simulating the numerical keys, "Lift" for answering an incoming call, and "Replace" for ending a call. Such speech recognition programs are known per se, for example from European patent application EP 0 601 876. The use of the solar panel 37 is known per se from German patent DE 195 21 135 C1.

Although the invention was explained above with reference to only a single embodiment, the invention is by no means limited thereto but covers each and every possible embodiment within the scope of the appended claims. Thus the external appearance of the telephone may be changed in dependence of individual wishes. The telephone may also be equipped with more or fewer functions. The telephone could be provided externally with additional features such as LCD displays, connectors for connection to the mains, or fringe equipment, etc. on one of the parts 25, 27 of its outer surface.

I claim:

1. A cordless telephone comprising:

a housing comprising a first housing part with a loudspeaker, and a second housing part with a microphone, said first and second housing parts being provided with a first and a second support portion, respectively;

a hinge pivotally coupling said first and second housing parts, in a folded state of said cordless telephone said second housing part lying over said first housing part, and in an open state said second housing part lying at least substantially in an extended direction of said first housing part; and switching means for switching a function of said cordless telephone;

said first and second support portions being located adjacent said hinge, said switching means being located adjacent said support portions, in said folded state said first and second support portions cooperatively forming a stable support surface for upright placement of said cordless telephone on an at least substantially flat supporting surface, and in said folded state said switching means resiliently extending through and outside at least one of said first and second support portions so as to operate said function by placing said cordless telephone on said supporting surface and lifting said cordless telephone from said supporting surface.

2. A cordless telephone as claimed in claim 1, wherein the first and second housing parts are dimensioned such that in said folded state said second housing part at least substantially covers said first housing part, and in said folded state outward facing surfaces of said first and second housing parts substantially form a common uninterrupted three-dimensional plane with a fluent curvature, said three-dimensional plane merging into a boundary surface formed by said cooperating first and second support portions.

3. A cordless telephone as claimed in claim 1, wherein said cordless telephone comprises a hands-free function, said switching means switching said hands-free function on and off.

4. A cordless telephone as claimed in claim 3, wherein said cordless telephone comprises a voice operation function and a speech recognition program for recognizing commands spoken by a user of said cordless telephone.

5. A cordless telephone as claimed in claim 3, wherein said loudspeaker remains uncovered in said folded state, and said microphone is acoustically accessible through a first acoustical passage extending through an exterior part of said second housing part when said cordless telephone is in said folded state, and through a second acoustical passage extending through a part of said housing opposite said exterior part.

6. A cordless telephone as claimed in claim 3, wherein said loudspeaker remains uncovered in said folded state, and said second housing part comprises a further microphone, said microphone being located at one side of said second housing part and said further microphone being located at an opposite side of said second housing part, said microphone being acoustically accessible when said cordless phone is in said folded state and said further microphone being acoustically accessible when said cordless phone is in said open state.

7. A cordless telephone as claimed in claim 1, comprising solar power cells for charging a battery comprised in said cordless telephone.

8. A cordless telephone comprising:

a housing comprising a first housing part with a loudspeaker, and a second housing part with a microphone, said first and second housing parts being provided with a first and a second support portion, respectively; and a hinge pivotally coupling said first and second housing parts, in a folded state of said cordless telephone said second housing part lying over said first housing part, and in an open state said second housing part lying at least substantially in an extended direction of said first housing part;

said first and second support portions being located adjacent said hinge, and comprising at least three studs and at least three recesses, said studs and recesses being spatially distributed over said first and second support portions, said recesses being placed so as to mate with said studs, and in said folded state said studs forming a stable support for upright placement of said cordless telephone on an at least substantially flat supporting surface.

* * * * *